United States Patent
Ragg et al.

(10) Patent No.: US 9,803,649 B2
(45) Date of Patent: Oct. 31, 2017

(54) AXIAL OR DIAGONAL FAN WITH TRIP EDGE ON THE ROTOR BLADE

(71) Applicant: EBM-PAPST ST. GEORGEN GMBH & CO. KG, St. Georgen (DE)

(72) Inventors: Peter Ragg, Schoenwald (DE); Michael Stadler, Graz (AT)

(73) Assignee: EBM-PAPST ST. GEORGEN GmbH & Co. KG, St. Georgen (DE)

( * ) Notice: Subject to any disclaimer, the term of this patent is extended or adjusted under 35 U.S.C. 154(b) by 406 days.

(21) Appl. No.: 14/356,167

(22) PCT Filed: Dec. 20, 2012

(86) PCT No.: PCT/EP2012/076521
§ 371 (c)(1),
(2) Date: May 4, 2014

(87) PCT Pub. No.: WO2013/104513
PCT Pub. Date: Jul. 18, 2013

(65) Prior Publication Data
US 2014/0286786 A1 Sep. 25, 2014

(30) Foreign Application Priority Data

Jan. 12, 2012 (DE) .......... 10 2012 000 376

(51) Int. Cl.
*F04D 29/38* (2006.01)
*F04D 29/68* (2006.01)

(52) U.S. Cl.
CPC ......... *F04D 29/384* (2013.01); *F04D 29/681* (2013.01); *F05D 2240/306* (2013.01); *Y02E 10/721* (2013.01)

(58) Field of Classification Search
CPC ................ F04D 29/384; F04D 29/681; F05D 2240/306; Y02E 10/721
(Continued)

(56) References Cited

U.S. PATENT DOCUMENTS 1,531,967 A * 3/1925 Macmillan ............... B63H 1/20
416/236 R
1,725,482 A * 8/1929 Schertz ................... B64C 11/16
416/202

(Continued)

FOREIGN PATENT DOCUMENTS

DE 2263310 A 7/1973
EP 0132638 A2 2/1985
(Continued)

OTHER PUBLICATIONS

Autodesk.com, "SimulationCFD for CFD Analysis" retrieved May 5, 2014.
(Continued)

*Primary Examiner* — William McCalister
(74) *Attorney, Agent, or Firm* — Milton Oliver; Oliver Intellectual Property (57) ABSTRACT

An axial- or diagonal-fan has a fan wheel (34) having profiled rotor blades (32). Each blade has a suction or intake side (46), a portion located forward, with respect to the rotation direction (36), and having a leading edge (44), and a portion located rearward, with respect to the rotation direction (36), and having a trailing edge (92). Between said portions, on the intake side (46) of the respective rotor blade (32), a trip or separation edge (66) is provided, said trip edge having an S-shaped contour in a meridian cross-section.

8 Claims, 6 Drawing Sheets

(58) Field of Classification Search
USPC .......................................... 416/236 R, 236 A
See application file for complete search history.

(56) References Cited

U.S. PATENT DOCUMENTS

| | | | | |
|---|---|---|---|---|
| D127,167 S | * | 5/1941 | Bahr | 416/236 A |
| 3,481,531 A | * | 12/1969 | Macarthur | F04D 29/284 |
| | | | | 415/914 |
| 3,578,264 A | * | 5/1971 | Kuethe | B64C 21/10 |
| | | | | 181/220 |
| 4,737,077 A | * | 4/1988 | Vera | F01D 5/141 |
| | | | | 416/169 A |
| 4,757,587 A | * | 7/1988 | Choi | F04D 29/384 |
| | | | | 29/889.3 |
| 4,822,249 A | * | 4/1989 | Eckardt | F01D 5/145 |
| | | | | 416/235 |
| 4,869,644 A | * | 9/1989 | Takigawa | F04D 29/661 |
| | | | | 415/119 |
| 4,974,633 A | * | 12/1990 | Hickey | B63H 9/06 |
| | | | | 137/561 R |
| 4,975,023 A | * | 12/1990 | Miura | B63B 1/24 |
| | | | | 416/235 |
| 5,133,519 A | * | 7/1992 | Falco | B64C 21/04 |
| | | | | 244/130 |
| 5,169,290 A | * | 12/1992 | Chou | F01D 5/145 |
| | | | | 416/223 B |
| 5,505,409 A | * | 4/1996 | Wells | B64C 1/38 |
| | | | | 244/130 |
| 5,540,406 A | * | 7/1996 | Occhipinti | B63B 1/248 |
| | | | | 244/198 |
| 6,254,476 B1 | * | 7/2001 | Choi | F24F 7/007 |
| | | | | 416/223 R |
| 6,398,502 B1 | | 6/2002 | Wobben | 416/228 |
| 6,872,048 B2 | * | 3/2005 | Uselton | F04D 29/384 |
| | | | | 415/119 |
| 7,331,758 B2 | | 2/2008 | Arinaga et al. | 415/221 |
| 7,396,212 B1 | * | 7/2008 | Parker | F04D 25/088 |
| | | | | 416/223 R |
| 7,494,325 B2 | * | 2/2009 | Gustafson | F04D 29/384 |
| | | | | 415/914 |
| 7,878,759 B2 | * | 2/2011 | Mills | F01D 5/145 |
| | | | | 416/1 |
| 2003/0098144 A1 | * | 5/2003 | Uselton | F04D 29/384 |
| | | | | 165/104.34 |
| 2005/0260075 A1 | | 11/2005 | Arinaga et al. | 415/220 |
| 2010/0209258 A1 | | 8/2010 | Fuglsang et al. | 416/90 R |
| 2012/0195776 A1 | * | 8/2012 | Ragg | F04D 25/082 |
| | | | | 417/423.7 |
| 2013/0129519 A1 | | 5/2013 | Nielsen | 416/228 |
| 2014/0286786 A1 | * | 9/2014 | Ragg | F04D 29/384 |
| | | | | 416/236 R |

FOREIGN PATENT DOCUMENTS

| | | |
|---|---|---|
| FR | 2282548 | 3/1976 |
| GB | 2032048 A | 4/1980 |
| JP | 2-023300 A | 1/1990 |
| JP | 3-206395 A | 9/1991 |
| JP | 2000-345995 A | 12/2000 |
| WO | WO 2010-139815 A | 12/2010 |

OTHER PUBLICATIONS

Wikipedia.org , "Particle Image Velocimetry" 12pp, retrieved May 5, 2014.

* cited by examiner

Fig. 6

AXIAL OR DIAGONAL FAN WITH TRIP EDGE ON THE ROTOR BLADE

CROSS-REFERENCE

This application is a section 371 of PCT/EP2012/07651, filed 20 Dec. 2012, published 18 Jul. 2013 as WO-2013-104513-A1, and further claims priority from German application DE 10 2012 000 376.5 filed 12 Jan. 2012.

FIELD OF THE INVENTION

The invention relates to an axial- or diagonal-fan with a rotating fan wheel, which is also called an impeller.

BACKGROUND

On the intake side of the rotor blades, during operation, a boundary layer is formed. In the case of a blower, the boundary layer is subjected to a positive pressure gradient created by the blower, and it follows from this, that the boundary layer can detach. The disadvantages of such a detachment of the boundary layer are higher resistance, and stall. The efficiency of the blower is thereby negatively influenced, and its acoustic noise emissions increase.

In order to hinder the flow detachment or to displace the beginning of the flow detachment in the direction of the trailing edge of the respective blade, the so-called "turbulators" were developed. This term means measures for inducing a changeover from laminar flow to turbulent flow. The advantage of a turbulent rather than a laminar boundary layer lies in its higher kinetic energy, which enables a greater pressure increment without detachment. However, such turbulators make no sense for fast-turning blowers since, in their case, the flow is turbulent anyway.

It is therefore an object of the invention to provide a new blower with improved characteristics.

This object is achieved by forming a trip edge, running from a radially inner side of a rotor blade to a radially outer side thereof, having a generally S-shaped contour and located, measured from the leading edge of the rotor blade, within a band spanning from about 30% to 100% of the length L from leading edge to trailing edge of the blade.

For improvement of the flow relationships on the blade surface, the invention employs a discontinuity of the blade surface. In technical terminology, this is called, for example, a breakdown edge, a step or a "trip-wire." Conventional trip-wires extend radially and cause—in the case of slow-turning blowers—adjacent the leading edge of the moving blade, a changeover from laminar to turbulent flow. It has been shown that, with such a trip-wire, the flow will detach as function of the load on the moving blade on the intake or suction side of the blade profile. From this point, the profile is surrounded by a suddenly thicker-becoming, non-contacting and uncoordinated flow. For the neighboring flow, this has the same effect,
as if the moving blade were significantly thicker. Thereby, the blade channels of the blower become partially or completely blocked, and the delivered volumetric flow therefore diminishes. By "blade channels," one understands the passage between two adjacent fan blades.

For this reason, the form of the contour of an optimized trip edge follows the contour of the detachment zone in the vicinity of the trailing edge of the respective blade. Thereby, the boundary layer at the point, at which the detachment would begin, is supplied with additional energy. Behind the step, a recirculation zone, consisting of micro-eddies, forms, over which the adjacent flow can glide with minimal friction. In contrast to conventional trip edges, the detachment zone either locates itself more strongly toward the trailing edge of the relevant blade, or the detachment zone is completely eliminated. The following advantages thereby result:

Pressure increase of about 6.3%
(calculated via CFD-simulation)
Reduction of noise energy in the free-exhausting range, thus reduction of fan noises.
(CFD-Simulation Means Simulation by Computational Fluid Dynamics)

By a contour-optimized trip edge on the suction side of the relevant fan blade, an expanded or stretched recirculation zone forms downstream, along the blade surface (on the suction side). This reduces friction for the fluid layers passing thereover. Thus, the boundary layer can be provided with renewed kinetic energy. Its energy equilibrium settles in a stable range, and the flow detachment is displaced into a downstream-lying zone. This lengthens the effective region of the rotor blade and guides the flow, corresponding to its exit contour, over this rotor blade. Since the rotor blade has nearly optimal flow adjacent it for the entire operating range of the blower, the noise energy, emitted by the blower in the regions away from the designed operating point, is reduced.

The form of the trip edge is, in the ideal case, matched to the contour of the detachment zone at the design point, and it describes a curve parallel to the contour of the detachment area with a spacing DS approximating 1 to 2% of the diameter D of the fan wheel. This is necessary, in order to achieve effectiveness in the operating states which deviate from the design point. In general, the trip edge thus has the form of a stretched S, which runs approximately parallel to the trailing edge of the respective rotor blade.

Further details and advantageous refinements of the invention will be apparent from the embodiments described below, and shown in the drawings, which in no way are to be understood as limiting the invention.

BRIEF FIGURE DESCRIPTION

FIGS. 6a) through 6d), diagrams for explanation of the invention.

DETAILED DESCRIPTION

The fan wheel 30 has, in this exemplary embodiment, five profiled fan blades 32, which are connected to a hub 34. The rotation direction of fan wheel 30 is designated 36 and, in this example, runs clockwise, when one observes fan wheel 30 by looking in the direction of arrow 38.

Hub 34 has openings or pockets 40, into which, during balancing, balance or compensating weights can be inserted, insofar as any imbalance has been found.

Figure 1:
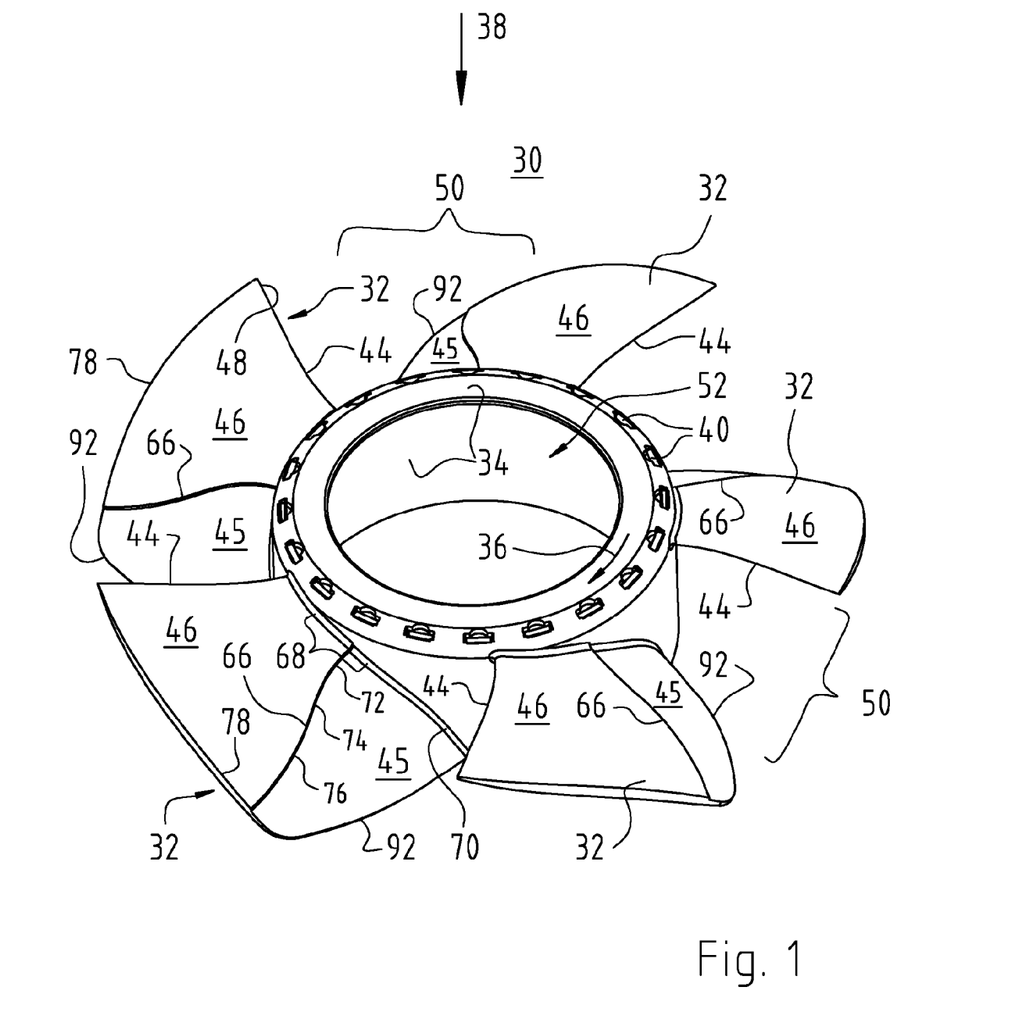
FIG. 1, an illustration of a preferred embodiment of the fan wheel of an axial fan, the trip edge and the flow pattern occurring thereon being illustrated only for one rotor blade.

Since the rotor blades 32 are substantially identical and have the same or similar angular spacings from each other, it suffices to describe one of the rotor blades 32, which is shown at bottom left in FIG. 1. This is usually made integral with the hub 34 and with the other rotor blades 32, frequently as an injection-molded part of a suitable plastic or of a suitable metal.

The rotor blades 32 have influx edges (leading edges) 44 which here are slightly sickle-shaped. The upper surfaces, visible in FIG. 1, of rotor blades 32 are the suction sides 46 of these rotor blades 32. The undersides 48, not visible in FIG. 1, of the rotor blades 32 are the pressure or delivery sides of these rotor blades 32. Between adjacent rotor blades 32, there extend blade channels 50, through which the pumped air flows. These blade channels 50 should, to the extent possible, be free of hindrances to the flow, so that the fan (blower) 20 can transport, in an effective manner, the air or other gas in the direction of arrow 38 from the suction or intake side 52 to the pressure or output side 54.

Figure 3:
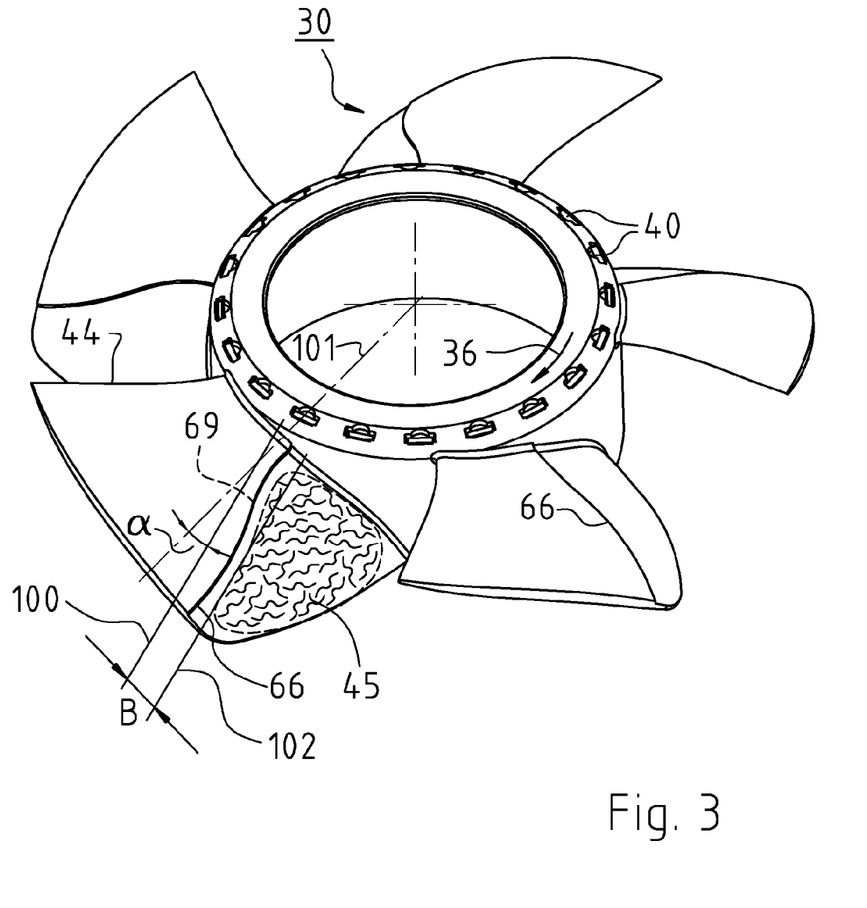
FIG. 3, an illustration of the preferred zone of a rotor blade, in which zone the S-shaped trip edge is preferably arranged.
Figure 6:
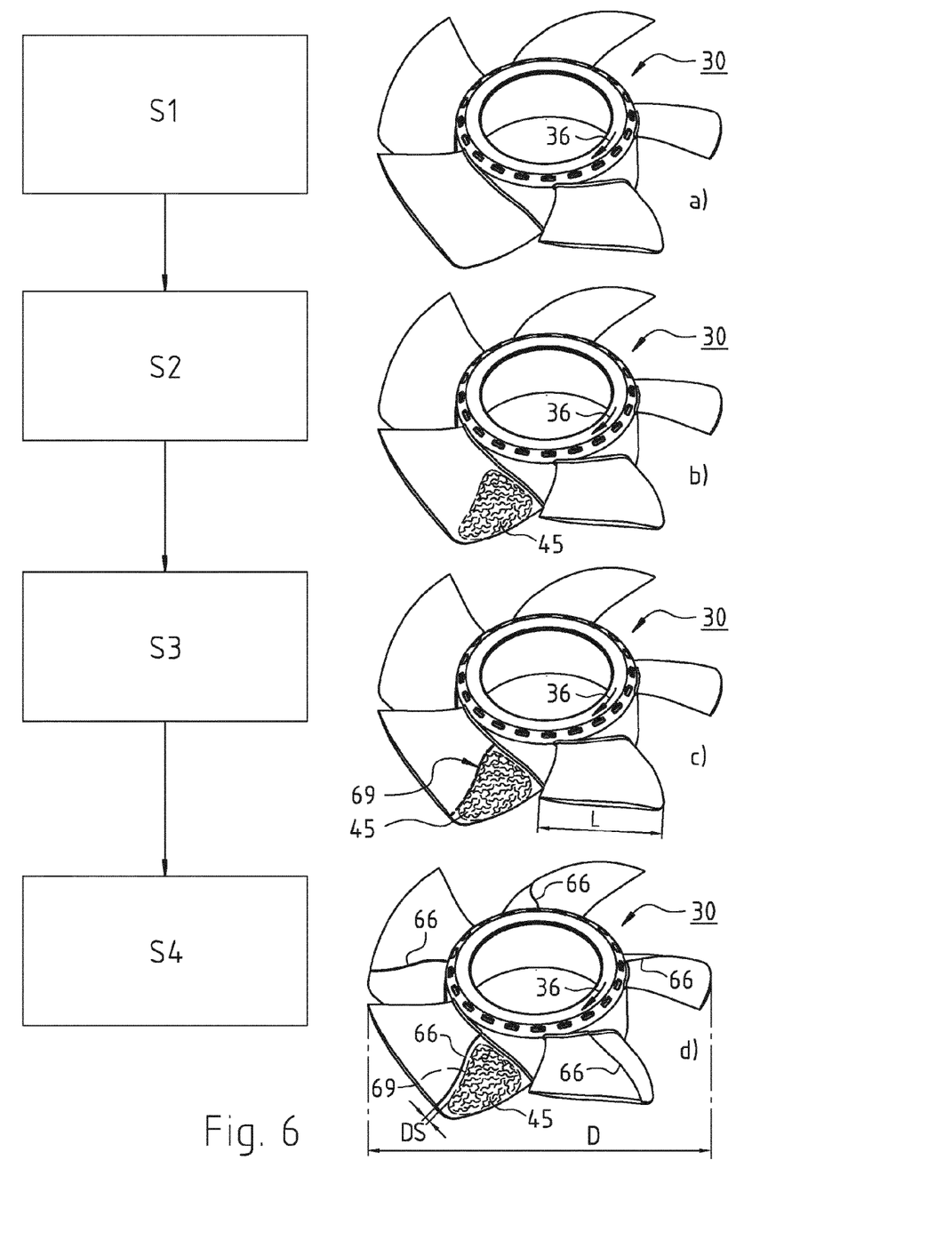

As shown in FIG. 1, the air flow 60, on the suction side (upper side) 46 of a rotor blade, runs from its leading edge 44 initially approximately in a circumferential direction and then transitions, due to aerodynamic effects, in a detachment zone (45) into a more-outwardly-directed flow. The transition happens adjacent a trip edge (step, edge, discontinuity) 66. This extends from a middle region 68 at the rotor blade root (wing root) 70 and initially in a region 72 with an approximately radial direction, transitioning then into a left-tending curvature 74. This left-tending curvature 74 then transitions into a right-tending curvature 76 which extends approximately to the outer rim of the relevant rotor blade 32. The trip edge 66 thus has the form of an alternatingly-curved curve, which one could also characterize as a length-extended S. This curve is located within a band B, whose boundary lines 100, 102 taper between 0° and 40° as shown in FIG. 3. With respect to leading edge 44, this band B falls within a range of 30 . . . 100° of the rotor blade length L, shown in FIG. 6.

The form of trip edge 66 is, in the ideal case, matched to the contour of the detachment zone at the design point of the fan. It describes a curve parallel to the contour of the detachment area with a spacing DS approximating 1 to 2% of the diameter D of the fan wheel. This is necessary, in order to achieve effectiveness in the operating states which deviate from the design point. In general, the trip edge 66 thus has the form of an alternatingly-curved curve, as illustrated in FIG. 1.

Figure 2:
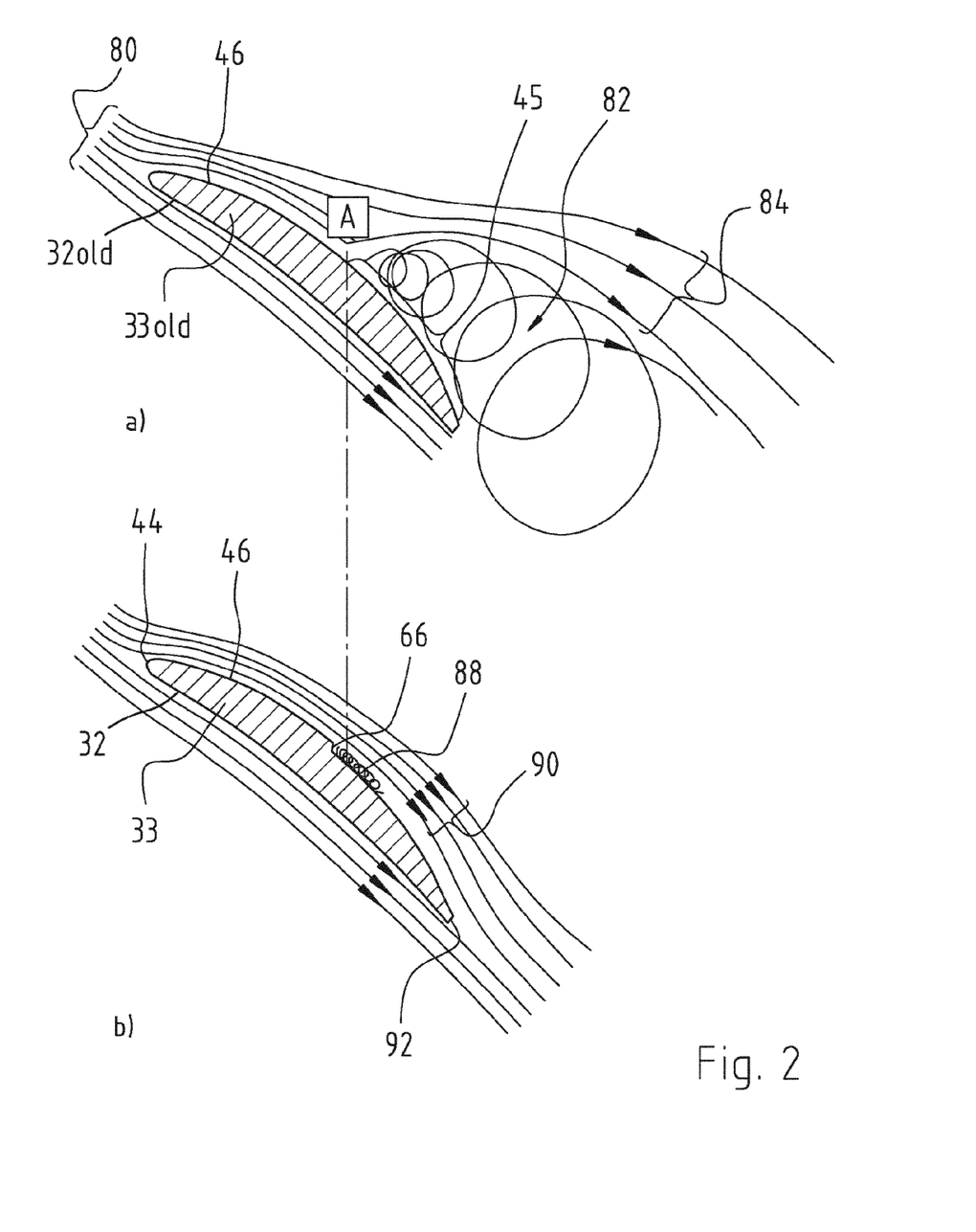
FIG. 2, an illustration of eddy formation on a conventional rotor blade (2a) and on an improved rotor blade (2b)

For purposes of explanation, reference is made to FIG. 2. The upper illustration according to FIG. 2(a) shows the profile 33old as a section through a rotor blade 32old without a trip edge 66, and the air flow 80 which surrounds this rotor blade 32old. The letters "old" in 32old and 33old indicate that no trip edge 66 is provided. Depending upon the load on this rotor blade 32old, the flow 80 in the detachment zone 45 on the suction side 46 can detach, e.g. beginning at the point marked "A" in FIG. 2a). The location of detachment zone 45 can be ascertained via a CFD-simulation, or via so-called "tracer" images. According to the latter, oil is applied to the relevant rotor blade 32old, and the fan is placed into operation. As long as the oil has not dried, oil droplets follow the airflow lines across the surface of the rotor blade. In the zone of the flow detachment, the flow lines 62 no longer run in the circumferential direction, but rather in a radially outward direction.

From point A onward, profile 33old is surrounded by a suddenly thicker, non-contacting and uncoordinated flow 82. The adjacent flow 84 perceives the profile 33old of rotor blade 32 as substantially thicker, since this is actually the case. The blade channels 50 of the blower, i.e. its effective transmitting cross-section, are thereby narrowed, and the air output (the delivered volumetric flow) drops.

In order to avoid this problem, or to at least reduce it, according to FIG. 2b), which illustrates the profile 33 of rotor blade 32, a trip edge 66 is provided, shortly before the region "A" (compare FIG. 2a)) at which the flow would detach. There, the boundary layer is newly loaded up with kinetic energy, and a detachment of the flow can thereby be avoided. Downstream of the trip edge (step) 66, a recirculation zone 88 comprised of micro-eddies forms, over which the adjacent stream 90 can glide with minimal friction. This zone 88 is also illustrated in FIG. 3. The detachment zone 87 is either displaced further in the direction of trailing edge 92 than via a conventional trip edge, or is actually completely eliminated (see FIG. 2b)). Thereby, the following advantages result:

Pressure increase of about 6.3%
(calculated via CFD-simulation)
Reduction of noise energy in the free-exhausting range.

The fact, that the boundary layer is newly provided, enroute, with kinetic energy, displaces its energetic equilibrium into a stable region, and the flow detachment is displaced into a downstream-lying zone. This lengthens the effective region of the rotor blade, and guides the flow corresponding to its exit contour over the apparatus. Since, in the entire operating range of the blower, nearly optimal flows occur, the noise energy emitted by the blower drops, in the regions either side of the design point, i.e. deviating from the point at which the blower was designed to operate.

In FIG. 1, there forms, in the region downstream of the trip edge (step) 66, a thin recirculation zone 88 (FIG. 2b)) and this can supply supplemental energy to the fluid layers 90 passing thereover. Thereby, the flow detachment is retarded, i.e. it is displaced in the direction of trailing edge 92. This can be scalloped, in order to reduce fan noise.

The trip edge 66 should be provided a short distance before the detachment zone 45 (FIG. 1) in order to avoid, there, a detachment of the flow.

The trailing edge 92 can be scalloped. This advantageous configuration has no influence upon the trip edge 66. It serves to reduce noise generation in the region of the trailing edge 92.

Figure 4:
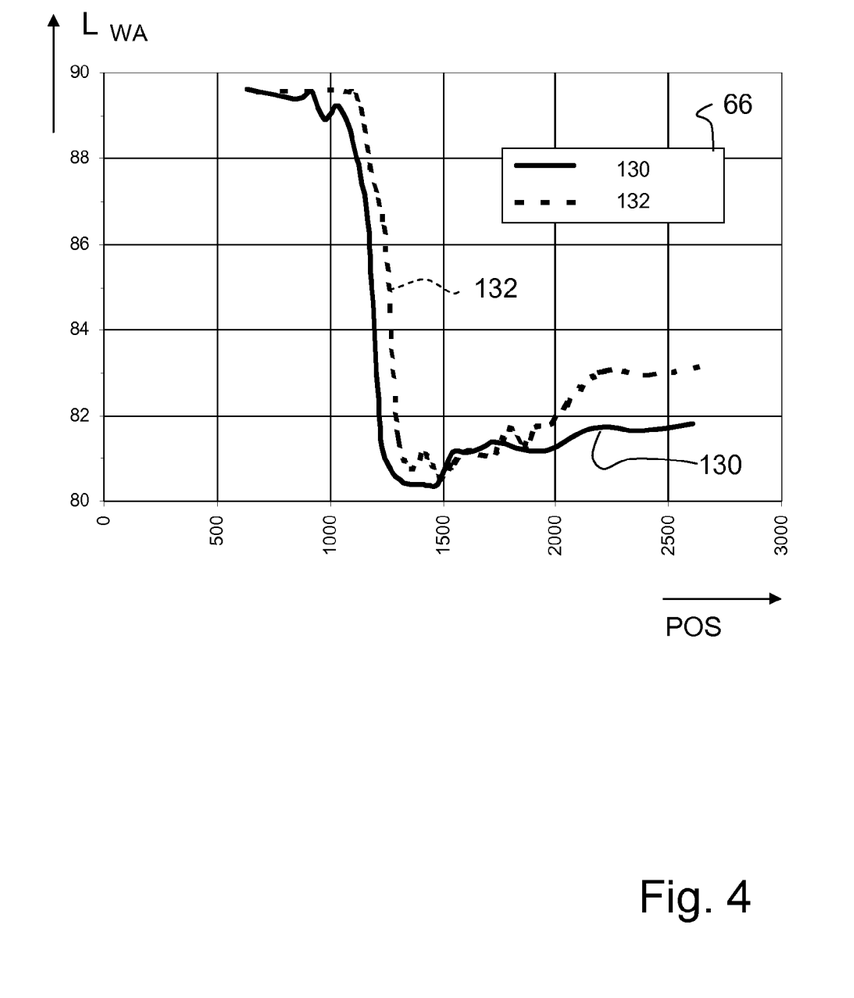
FIG. 4, a diagram which shows the advantages achieved.

FIG. 4 shows a comparison between operating characteristic curves. On the abscissa (horizontal axis) of the graph is the position POS of a throttle (not shown) and on the ordinate (vertical axis) of the graph, the noise emission $L_{WA}$ in units dB/lpW is plotted. The solid (continuous) characteristic curve 130 is that of a blower with a contour-optimized trip edge 66, and the dash-dotted characteristic curve 132 is that of a blower with no trip edge, as shown in FIG. 2a). The designed operating point of this special blower is at the throttle position POS=1400. The free discharge region is at throttle position POS=2500. An axial blower is generally operated between these two positions (1400 and 2500), and here the blower with trip edge 66 is advantageous. (The design operating point of this special blower is at POS=1400).

FIG. 6d) shows the diameter D of fan wheel 30. The trip edge 66 runs, in FIG. 6d), not directly at the boundary of detachment zone 45, but rather at a predetermined safety spacing DS from this zone, which is approximately one to two percent of D. Thus, the trip edge 66 is most advantageously matched to the contour of the detachment zone 45, as illustrated in FIG. 6d).

FIG. 3 illustrates a region B, through which trip edge 66 runs. Since trip edge 66 follows the contour of detachment zone 45, it is curved and thus falls between the boundary lines 100 and 102 of region B. Preferably, these lines do not run exactly radially, but rather their inner portions are, with reference to rotation direction 35, farther forward than their outer portions.

Figure 5:
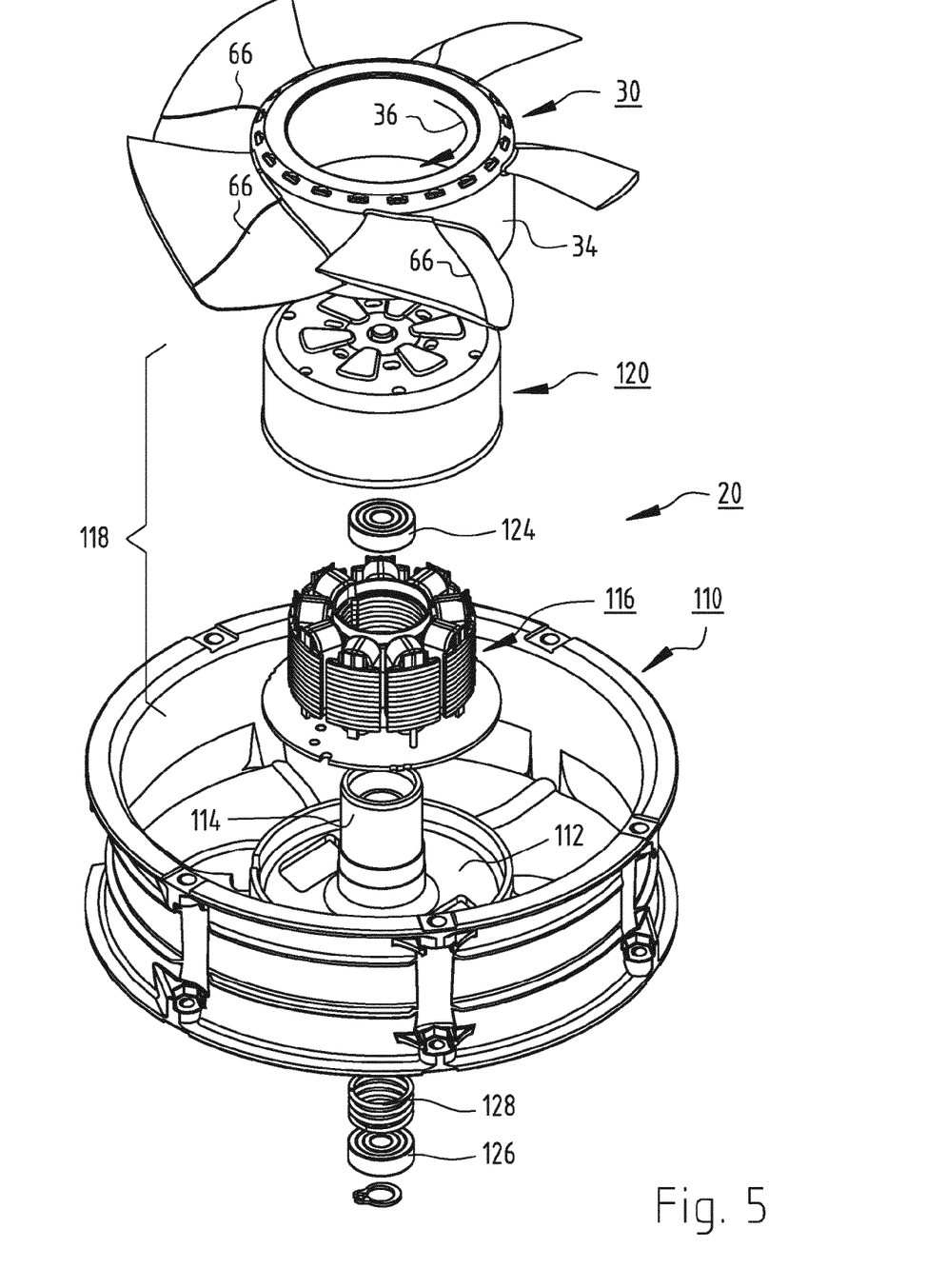
FIG. 5, an exploded view of a fan, in which, on the suction or intake side of the rotor blades, corresponding "trip edges" are provided.

FIG. 5 is an exploded view of a blower. At the bottom, one sees the fan housing, formed with a generally cylindrical fanwheel-facing inner surface (110), in which is secured a flange 112 which supports a bearing tube 114. Onto this, there is secured an internal stator 116 of an electronically commutated motor (ECM) 118. The motor 118 has a permanent-magnet external rotor 120, onto which the hub 34 of the fan wheel 30 is secured, e.g. by adhesive or press-fitting.

In the bearing tube 114, the shaft (not visible in FIG. 5) of the external rotor 120 is supported. Serving for this purpose are two ball bearing races 124, 126, which are urged apart from each other by a spring 128.

FIGS. 6a) through 6d) show, in a diagram, considerations for the layout or configuration of a fan wheel 30.
Steps S1 through S4 have the following content:
S1=Step 1: configuration of the fan for a defined operating point (delivery quantity, pressure, rotation speed)
S2=Step 2: specification of the detachment zone 45
S3=Step 3: specification of the form of edge 69 (dashed line) which borders on the detachment zone
S4=Step 4: Safety margin DS defines a final form of the trip edge.

In FIG. 6a), the fan is configured for a defined operating point, e.g. in FIG. 4 for a throttle setting of POS=1400, and for a curve form 130 (FIG. 4) corresponding to a reduced loudness, particularly in the range of POS=1400 . . . 2500, the setting POS=2500 corresponding to the free discharge region. For example, even an existing fan type can, according to the invention, be so improved that its noise energy drops without additional costs.

In FIG. 6b), the position of the detachment or separation zone 45 is ascertained, e.g. from so-called tracer-images, as previously described. Also, a CFD-simulation is possible, for purposes of ascertaining the position of the detachment zone 45.

The detachment zone 45 has a boundary 69, shown in FIG. 6d), which can vary somewhat, as a function of the operating conditions. Therefore, in FIG. 6d), a small safety margin displacement DS is added, in order to arrive at the final form of the trip edge 66. The magnitude of displacement DS of the safety zone in many cases is 1 to 2% of the diameter D of the fan wheel 30, as shown in FIG. 6d). Naturally, the thus-derived position of the trip edge 66 can be verified via experimentation and possibly further refined.

The trip edge 66 has the form of an alternatingly-curved curve and runs generally parallel to the boundary of detachment zone 45.

In this manner, the implementation of the invention becomes very simple, and can possibly be substantially automated; when plastic is used in the manufacture of the fan wheel, the trip edge can be made, for example, by injection molding.

The figures and the description disclose an axial- or diagonal-blower with a fan wheel 30 equipped with rotor blades 32, each having an intake side 46, a portion located forward, with reference to the rotation direction and having a leading edge 44, and a portion located rearward, with reference to the rotation direction and having a trailing edge 92, between which edges a trip edge 66 is located, having in meridian section an S-shaped contour, the contour falling within a band B which, measured from the leading edge 44, falls within a range of 30% to 100% of the length L of the rotor blade 32.

Preferably, the band B is defined by boundary lines 100, 102 which include an angle α surrounding a line 101 extending radially with respect to the fan wheel 30, the magnitude of the angle falling between about 0° and about 30° relative to this line 101.

Preferably, the trip edge 66 is configured as a step on the suction or intake side 46 of the respective rotor blade 32.

Preferably, trip edge 66 runs from the radially inner side of a rotor blade 32, on its suction side 46, in the direction of the radially outer side of this rotor blade.

Preferably, trip edge 66 runs approximately in the form of a length-stretched S from the radially inner side of a rotor blade 32 to the radially outer side of this rotor blade 32.

Preferably, the length-stretched S of the trip edge 66 extends, on its radially inner portion, to a region 68 of the respective rotor blade 32 which lies, with reference to the circumferential dimension, in the middle of the blade.

Preferably, the length-stretched S extends, on its radially outer portion, to a region of rotor blade 32 which falls between the blade's trailing edge 92 and a region of blade 32 which, with reference to the circumferential dimension, lies in the middle.

Preferably, trip edge 66 runs mostly at a spacing DS from the contour of the detachment zone 45 and,
at least over most of its length, outside of detachment zone 45.

Preferably, the magnitude of spacing DS from the contour of detachment zone 45 approximates one to two percent of the diameter D of the fan wheel 34.

Naturally, within the scope of the present invention, many variations and modifications are possible.

What is claimed is:

1. An axial- or diagonal-blower with an electric motor with a stator (118) and a rotor (120), a fan wheel (30), and a housing formed with a fanwheel-facing generally cylindrical inner surface (110), the electric motor being arranged in said housing, said fan wheel (30) comprising
an annular fan wheel hub (34), secured to said rotor (120) and, together with the generally cylindrical inner surface (110), defining an annular air passage opening therebetween;
a plurality of individual profiled fan rotor blades (32), each extending radially from a root (70) at said hub (34) to a blade outer tip arranged in said annular air passage opening;
said profiled fan blades (32) each having an intake side (46), a portion located, with respect to rotation direction (36), forward and having a leading edge (44), a portion located, with respect to rotation direction (36), rearward, and having a trailing edge (92); between which portions a trip edge (66) is located, which, between said root and said tip, has an S-shaped contour,
said contour extending, from a radially inner portion of said fan rotor blade to a radially outer portion (78) thereof, inside a band (B) measured, starting from said leading edge (44), within a range from 30% to 100% of the width (L) of the fan blade (32), said trip edge running from said radially inner portion of the fan rotor blade to said radially outer portion of the fan rotor blade.

2. The blower of claim 1, wherein
said band (B) is defined by a pair of boundary lines (100, 102);

a line (101) runs, radially with respect to the fan wheel hub (34), across each respective rotor blade (32); and said pair of boundary lines enclose an angle (a) which is in a range between 0° and 30° relative to the radially running line (101).

3. The blower of claim 1, wherein the trip edge (66) is implemented as a step on a suction side (46) of the respective rotor blade (32).

4. The blower of claim 1, wherein the trip edge (66) runs from said radially inner portion of each blade into said radially outer portion thereof, adjacent a blade surface portion which, during fan operation, is contiguous with a detachment zone (45) formed abutting said blade, and wherein the trip edge (66) describes over its radial extent an alternatingly-curved course.

5. The blower of claim 4, wherein the alternatingly-curved course of the trip edge (66) extends, on its radially inner portion, to a region (68) of the respective rotor blade (32) which lies, with reference to the circumferential width dimension, in the middle of the blade.

6. The blower of claim 4, wherein the alternatingly-curved course of the trip edge (66) extends, on its radially inner portion, to a region (68) of the respective rotor blade (32) which lies between the trailing edge (92) thereof and a region which is, with reference to the circumferential dimension, in the middle of the blade.

7. The blower of claim 4, wherein the trip edge (66) runs at a distance (DS) from the contour of the detachment zone (45) and, at least over most of its length, outside of said detachment zone (45).

8. A blower according to claim 7, wherein a distance (DS) of the contour from the detachment zone (45) is one to two percent of the diameter (D) of the fan wheel (34).

* * * * *